(12) United States Patent
Lyatkher

(10) Patent No.: US 7,741,729 B2
(45) Date of Patent: Jun. 22, 2010

(54) NON-VIBRATING UNITS FOR CONVERSION OF FLUID STREAM ENERGY

(76) Inventor: Victor Lyatkher, 563 Barlow La., Richmond Hts., OH (US) 44143

( * ) Notice: Subject to any disclaimer, the term of this patent is extended or adjusted under 35 U.S.C. 154(b) by 43 days.

(21) Appl. No.: 12/287,962

(22) Filed: Oct. 15, 2008

(65) Prior Publication Data

US 2010/0090466 A1 Apr. 15, 2010

(51) Int. Cl.
*F03D 9/00* (2006.01)
*H02P 9/04* (2006.01)

(52) U.S. Cl. .......................................... 290/44; 290/55
(58) Field of Classification Search .................. 290/43, 290/44, 55, 54; 415/7, 4.2, 2.1; 60/398; 416/132 B
See application file for complete search history.

(56) References Cited

U.S. PATENT DOCUMENTS

| 1,945,373 | A | * | 1/1934 | Nolan | 416/130 |
| 3,050,007 | A | * | 8/1962 | Rydz | 415/69 |
| 3,969,037 | A | * | 7/1976 | Steiner | 416/176 |
| 4,236,866 | A | * | 12/1980 | Zapata Martinez | 415/4.4 |
| 4,293,274 | A | * | 10/1981 | Gilman | 416/51 |
| 4,517,471 | A | * | 5/1985 | Sachs | 307/67 |
| 4,648,796 | A | * | 3/1987 | Maghenzani | 415/218.1 |
| 5,405,246 | A | * | 4/1995 | Goldberg | 416/227 A |
| 5,451,137 | A | | 9/1995 | Gorlov | |
| 5,586,396 | A | * | 12/1996 | Kanai | 34/59 |
| 7,132,760 | B2 | * | 11/2006 | Becker | 290/55 |
| 7,518,256 | B2 | * | 4/2009 | Juanarena Saragueta et al. | 290/44 |
| 2005/0106023 | A1 | * | 5/2005 | Palley | 416/176 |
| 2006/0198724 | A1 | * | 9/2006 | Bertony | 415/4.4 |
| 2006/0257240 | A1 | * | 11/2006 | Naskali et al. | 415/4.4 |
| 2007/0029807 | A1 | * | 2/2007 | Kass | 290/55 |
| 2007/0273155 | A1 | * | 11/2007 | Barton et al. | 290/44 |
| 2008/0157530 | A1 | * | 7/2008 | Corcelles Pereira et al. | 290/44 |
| 2008/0191487 | A1 | * | 8/2008 | Morgan et al. | 290/55 |
| 2008/0203978 | A1 | * | 8/2008 | Schreiber | 322/8 |

FOREIGN PATENT DOCUMENTS

| RU | 2245456 | 5/2002 |
| RU | 2242634 | 5/2003 |
| SU | 1150395 | 1/1983 |

* cited by examiner

*Primary Examiner*—Julio Gonzalez

(57) ABSTRACT

A unit for conversion of fluid stream energy into electric energy is proposed, in one embodiment comprises two turbines rotatable in opposite directions, furnished with aerodynamically-profiled blades, each having a 'V'-shape evolvement line, then bent to produce a helix line wound upon a cylindrical surface, and an electro-generator including two short-circuited rotors coupled with the blades and an immovable inductor with a three-phase winding, magnetically associated with the rotors. The inductor includes a yoke, teeth located at each its side, stationary magnetic plates attached to the unit's structure via non-magnetic insertions. The winding is composed of coils comprising wires placed between the teeth, wherein the active sides of two phase coils are shifted relatively to each other being parallel to the longitudinal axis of said inductor, and phase-wise are oppositely shifted, wherein the two phase coils are situated adjacently to a third phase coil from the opposite sides thereof.

11 Claims, 5 Drawing Sheets

A-A

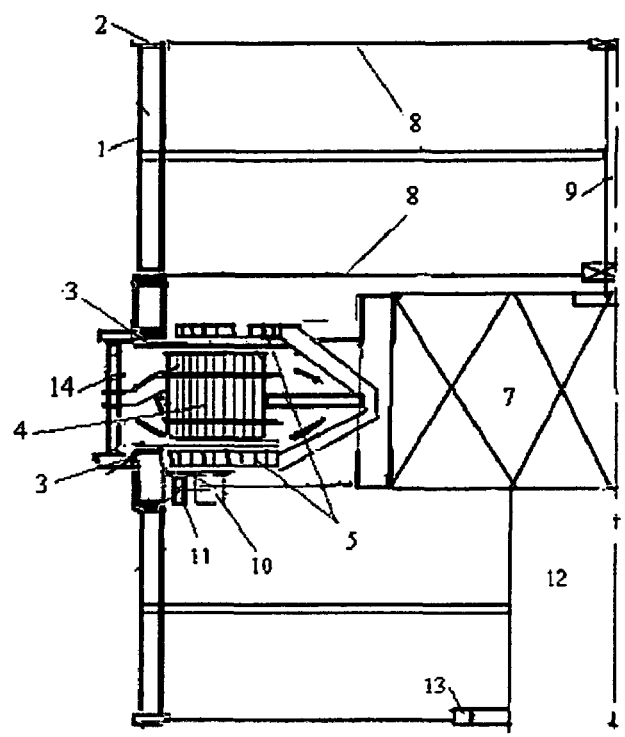
Fig. 4
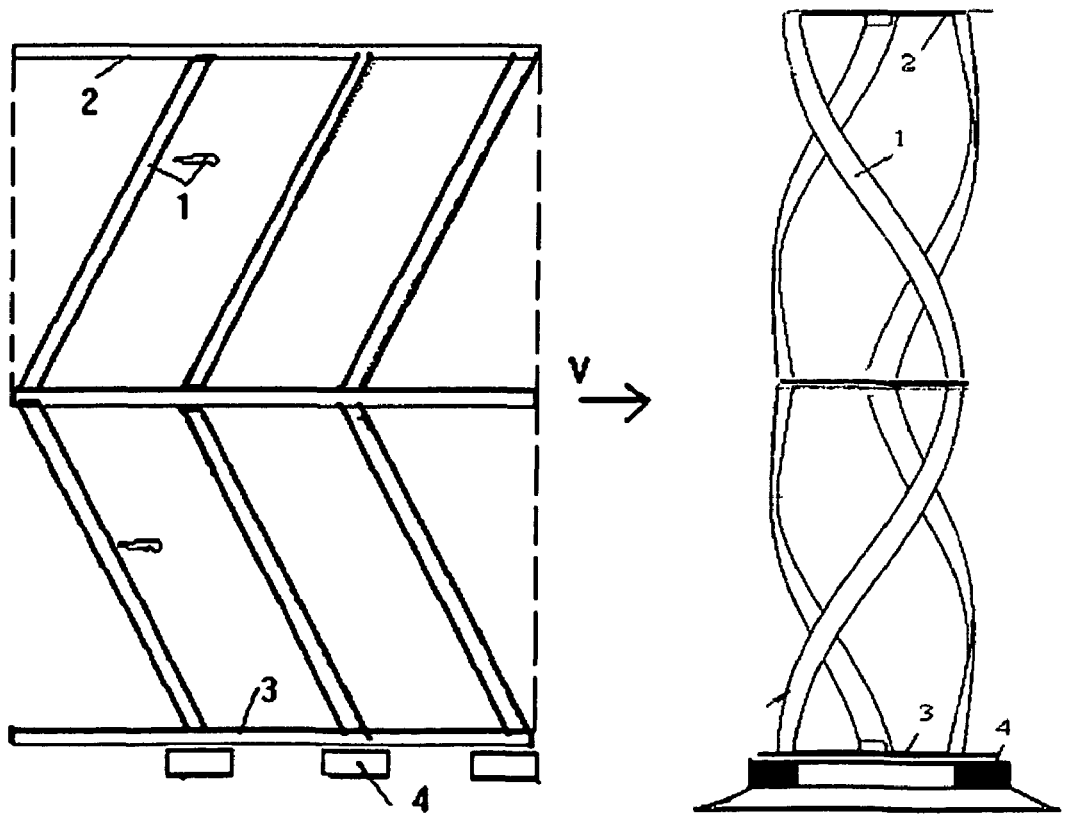
Fig. 5A
Fig. 5B

NON-VIBRATING UNITS FOR CONVERSION OF FLUID STREAM ENERGY

FIELD OF THE INVENTION

The invention relates to the field of hydro-power and wind-power engineering, particularly to construction of hydro-power and wind-power installations capable to convert renewable energy of water (e.g. river, tidal) steams, or atmospheric air streams (winds) into electric power. The invention can also find useful applications for other types of operating fluid deployed in similar installations.

BACKGROUND OF THE INVENTION

There is known an orthogonal power-conversion device, having a central axle, and a unit including blades having a hydro-dynamical profile configured according to a helix line (U.S. Pat. No. 5,451,137 issued Sep. 19, 1995), which unit is mounted on the axle. Such solution provides a constant twisting moment exerted upon the unit's axes and a constant force acting upon the unit, but does not provide a constancy of the bending moment applied to the base of the unit, and a constancy of cross-acting forces applied to the unit's supports.

There is known an orthogonal power unit in the form a spatial rotating truss tower formed by crossed helical blades of an aerodynamic profile (USSR Inventor's Certificate 1150395 issued Jan. 17, 1983). This structure provides a constant twisting moment, a constant cross-acting force, and a constant bending moment applied to the base of the unit, but has low power efficiency and significant density, due to high solidity and a big number of the blades in each level of the unit.

The closest prior art to the present invention in terms of its structure and achievable result is an orthogonal unit, having a central axle with mounted thereon two annular-shaped platforms furnished with blades rotatable in opposite directions, primary and secondary parts of a linear generator placed in the space between the platforms, a member for maintaining a clearance between the primary and secondary parts of the linear generator performed as slipper bearings (Russian Federation Patent RU2242634) or as rollers unloaded by special electromagnets (Russian Federation Patent RU2245456). In those power installations, the reaction loads are considerably reduced due to rotation of the platforms in opposite directions. However, it's not possible to completely compensate them, owing to inconformity of phases of the pulsing forces applied to the top platform and to the bottom platform. The loads acting upon the unit are not completely counterbalanced, that should cause vibrations of the unit worsening conditions of its operation and lowering its reliability.

SUMMARY OF THE INVENTION

As shown above, the known orthogonal devices have drawbacks due to vibrations and pulsations caused by the mentioned conditions. The primary goal of the present invention is to increase the reliability and efficiency of orthogonal power units. This goal is achieved by at least: (a) supplying a turbine (turbines) of an orthogonal power unit with a plurality of longitudinally disposed aerodynamically-profiled blades having an evolvement line configured in a 'V'-shape or an 'arrow'-shape, that line is then bent in such a manner that producing helix lines wound upon a vertical cylindrical surface; and (b) providing an electro-generator including a short-circuited rotor (rotors) coupled with the blades and an inductor with a three-phase winding. Other aims of the invention will become apparent from a consideration of the drawings, ensuing description, and claims as hereinafter related.

Therefore, a unit for conversion of fluid stream into electric energy is proposed. In one embodiment, the unit comprises of two turbines furnished with longitudinally disposed aerodynamically-profiled blades, each having a 'V'-shape evolvement line, and then so bent that producing a helix line wound upon a cylindrical surface, and an electro-generator including two short-circuited rotors coupled with the blades and an immovable inductor with a three-phase winding, magnetically associated with the rotors. The inductor includes a yoke, teeth located at each side of the yoke, stationary magnetic plates attached to the unit's structure via non-magnetic insertions. The winding is composed of coils comprising wires placed between the teeth, wherein the active sides of two phase coils are shifted relatively to each other being parallel to the longitudinal axis of said inductor, and phase-wise are oppositely shifted, wherein the two phase coils are situated adjacently to a third phase coil from the opposite sides thereof. Alternative embodiments of the invention are also described and illustrated.

BRIEF DESCRIPTION OF THE DRAWINGS

FIG. 4 is a schematic view illustrating structure of the energy unit, according to a preferred embodiment of the present invention.

FIG. 5 is a schematic view (FIG. 5A) illustrating an evolvement line of the turbine's 'V'-shaped blades of an energy conversion unit including a unilateral generator, and a side view (FIG. 5B) of the unit with a counterbalanced turbine, according to an embodiment of the present invention.

FIGS. 1-9 contain the following reference numerals denoting the corresponding elements of different embodiments of the inventive energy unit:

Figure 1A:
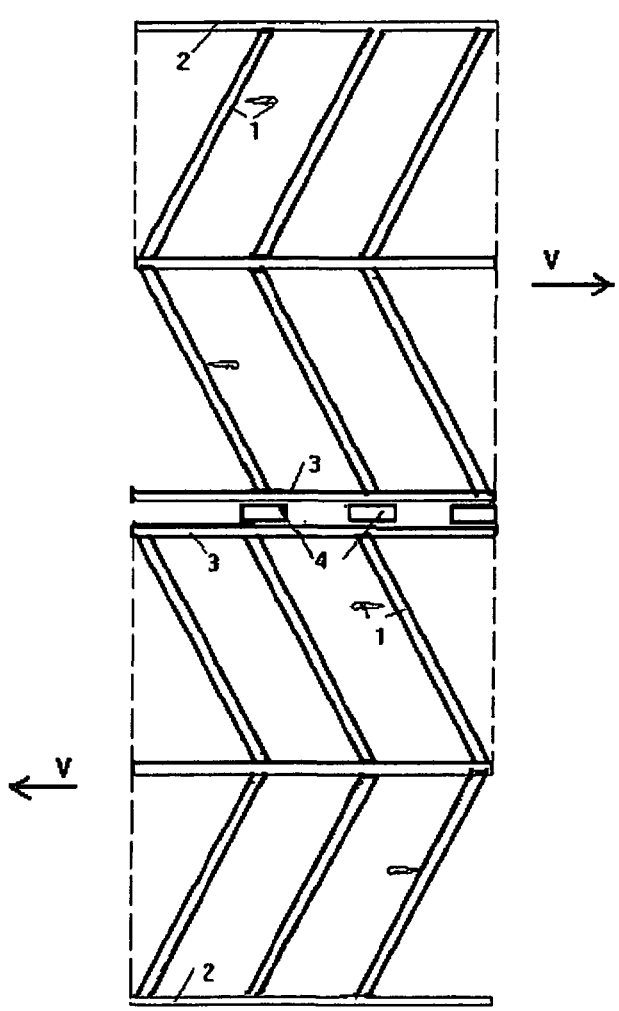
FIG 1A is a view showing an evolvement line of turbine blades of an energy conversion unit, according to a preferred embodiment of the present invention.

(1)—turbine blades of an aerodynamic profile;
(2)—outer rings joining the external ends of the blades 1;
(3)—short-circuited annular rotors joining the internal ends of the blades 1;
(4)—a stationary double-side inductor of an electro-generator of the energy unit, each side of the inductor 4 is active, and faces one of the rotors 3;
(v)—a speed vector of movement of the blades 1;
(5)—stationary magnetic plates of the inductor, capable of conducting a predetermined magnetic flux, the plates 5 and the corresponding sides of inductor 4 form a closed-loop magnetic circuit for the magnetic flux;
(6)—a direction of the magnetic flux;
(7)—a stationary horizontal bridge of the turbine;
(8)—pre-stressed strings transmitting radial loads from the blades 1 through bearings;
(9)—a stationary pylon receiving the radial loads from the strings 8;
(10)—a roller absorbing the lateral loads;
(11)—a roller absorbing the vertical loads;
(12)—a vertical support of the unit;
(13)—a ring centering the lower turbine of the unit;
(14)—a base roller to provide a predetermined distance between the rotors 3;
(15)—a balanced turbine with the left rotation;
(16)—a balanced turbine with the right rotation.

DETAIL DESCRIPTION OF EMBODIMENTS OF THE INVENTION

While the invention may be susceptible to embodiment in different forms, there are shown in the drawing, and will be described in detail herein, specific embodiments of the present invention, with the understanding that the present disclosure is to be considered an exemplification of the principles of the invention, and is not intended to limit the invention to that as illustrated and described herein.

Figure 1B:
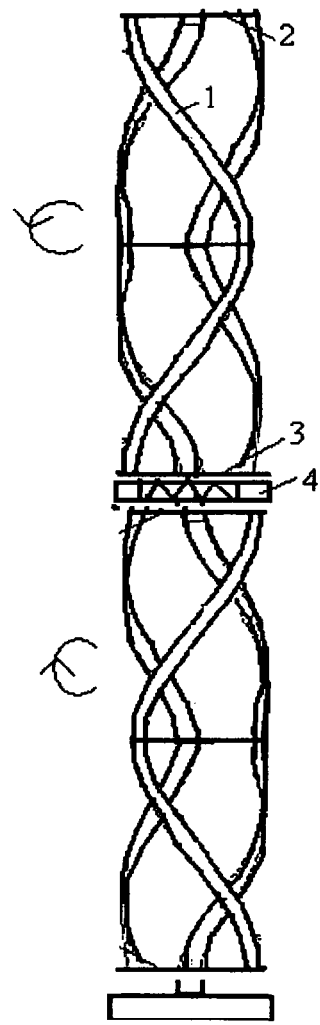
FIG. 1B is a side view of the energy unit including an upper turbine and a lower turbine with furnished with the aforesaid blades, according to a preferred embodiment of the present invention.
Figure 2A:
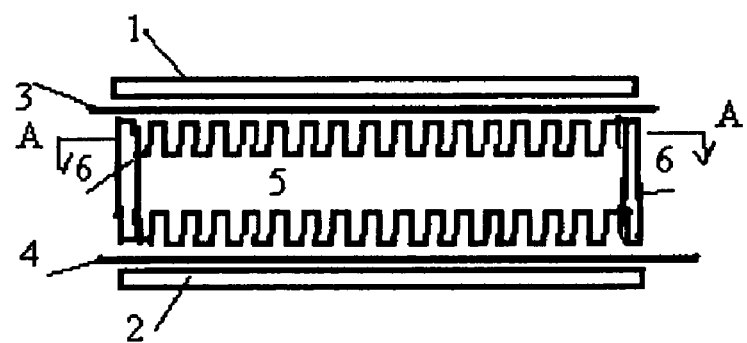
FIG. 2 is a frontal sectional view (A) and a partial sectional view (B) of a magnetic inductor being part of an electro-generator employed in the energy unit, according to the preferred embodiment of the present invention depicted on FIG. 1A-B.
Figure 2B:
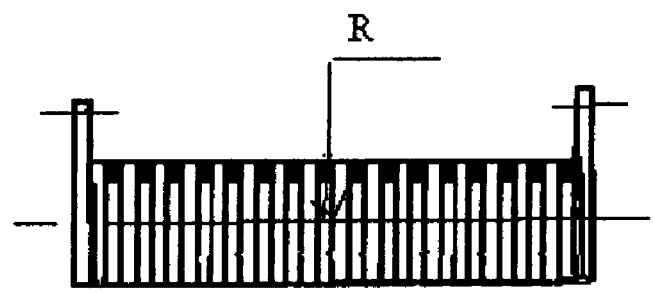

In a preferred embodiment shown on FIG. 4, the inventive energy conversion unit comprises: a stationary vertical support 12 of the unit; a stationary horizontal bridge 7, mounted on the support 12, an upper turbine and a lower turbine of the unit supported by the bridge 7, the turbines each is made of one section, and rotatable in the opposite directions, as shown on FIG. 1A-B, each turbine includes a predetermined plurality of longitudinally disposed blades 1 shaped in an aerodynamic profile; strings 8 transmitting radial loads from the blades 1 through bearings; a stationary pylon 9, mounted upon the bridge 7, and receiving the radial loads from the strings 8; outer rings 2 joining the external ends of the blades 1 (in alternative embodiments the outer rings can be replaced by another member: with a different shape capable to fix the blades thereon); an electro-generator including: two short-circuited annular rotors 3 substantially joining the internal ends of the blades 1, a stationary double-side inductor 4, substantially mounted on the bridge 7, wherein each side of the inductor 4 is active, and faces one of the rotors 3, and a plurality of stationary magnetic plates 5, substantially mounted on the bridge 7 preferably via non-magnetic insertions (not illustrated), the blades 5 are capable of conducting a predetermined magnetic flux, wherein the plates 5 and the corresponding sides of inductor 4 form closed-loop magnetic circuits for the magnetic flux thereby magnetically associating the inductor with the rotors; a roller 10, substantially mounted on the bridge 7, and absorbing the lateral loads; a roller 11, substantially mounted on the bridge 7, and absorbing the vertical loads; a ring 13 centering the lower turbine of the unit; and a base roller 14, substantially mounted on the bridge 7, to provide a predetermined distance between the rotors 3.

The blade 1 is produced from an evolvement line configured in a 'V'-shape (the 'V' is horizontally situated), shown on FIG. 1A); which line is then bent, in such a manner that producing a helix line wound up along a vertical cylindrical surface. The helix blades 1 of the upper and lower turbines are counter-directionally oriented (e.g. the 'V' of the upper turbine points to the left, whereas the 'V' of the lower turbine points to the right, as depicted on FIG. 1A-B). The profiles of blades 1 are so oriented that causing the upper and the lower turbines to rotate in the opposite directions.

Figure 8:
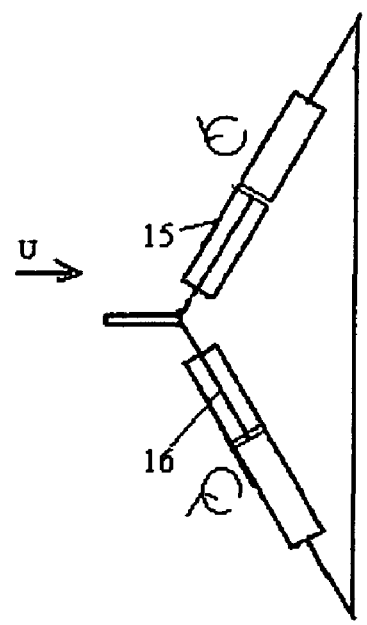
FIG. 8 is a schematic view partially illustrating an energy conversion unit, showing one of two two-sectional turbines including the 'V'-shaped blades, according to an optional embodiment of the present invention.

In some preferred embodiments, each turbine can be made of a plurality of sections joined together. FIG. 8 shows an inventive energy conversion unit comprising the upper and lower turbines, each of which includes two sections vertically stacked one above the other. Other embodiments may encompass the upper and lower turbines each including even more sections. The top and the bottom sections of the upper turbine include the blades 1 with the 'V' pointing to the left (as shown on FIG. 8). The sections of the lower turbine (not illustrated) are analogously designed, and the blades 1 have the 'V' pointing to the right. The profiles of blades 1 are so oriented that causing the upper and the lower turbines to rotate in the opposite directions. Such multi-sectional turbines allow compensating cross-'cutting' loads exerted onto the structure.

Figure 3:
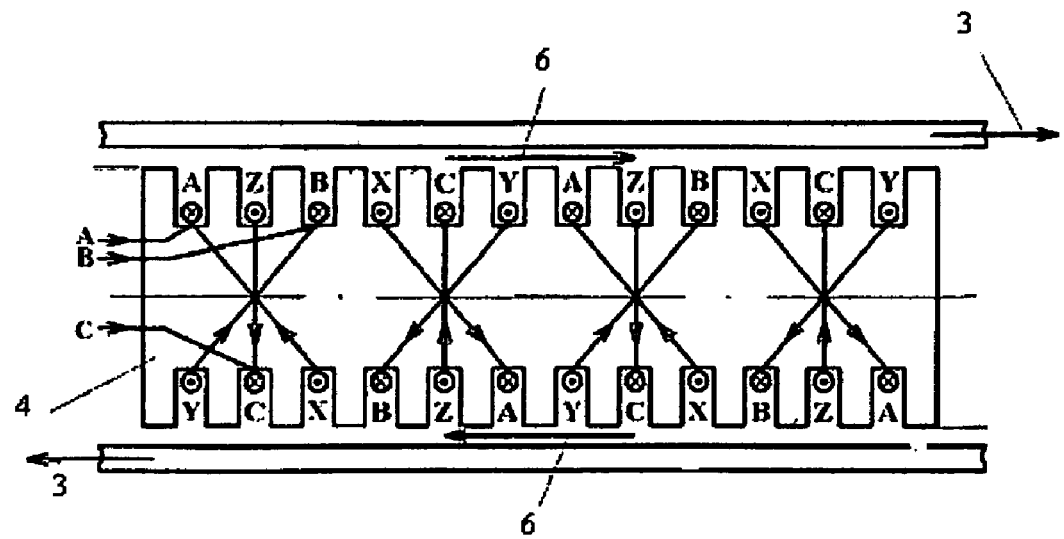
FIG. 3 is a schematic view illustrating structure of a three-phase winding of the inductor being part of the electro-generator employed in the energy unit, according to the preferred embodiment of the present invention depicted on FIG. 1A-B.

The upper and lower turbines with their corresponding rotors 3, rotatable in the opposite directions, face the opposite sides of the bilateral immovable inductor 4, accommodating cross-wisely located three-phase winding (with respective phase terminals A,B,C and X,Y,Z), providing movement of the magnetic fluxes 6 of the two sides of the inductor in the opposite directions, as shown on FIG. 3.

The preferred embodiments of inventive unit employ the arc type of electro-generator disposed between the upper and lower turbines. The electro-generator comprises two short-circuited rotors coupled with the above-described turbines having blades with so oriented profiles that causing rotation of the rotors in the opposite directions (providing a zero resultant rotation moment of the unit, i.e. minimizing or eliminating vibrations), and an immovable stationary inductor having two active sides. The inductor includes a core having two parts: a magnetically conductive yoke and a zone of magnetically conductive teeth. The teeth are located at each side of the yoke. Each two neighboring teeth define a groove therebetween. The grooves are filled with wires of a specially designed three-phase winding. The inductor includes a plurality of stationary magnetic plates that conclude a closed-type loop of the magnetic flux crossing the yoke, the teeth, the rotor, the plates, and air gaps formed between the rotors and the respective parts of inductor, thereby magnetically associating the inductor with the rotors. The magnetic plates are attached to the immovable structure via non-magnetic insertions reducing losses for re-magnetizing the supporting members of the structure.

The three-phase winding of the preferred embodiments is composed of coils, whose wires are placed in the aforesaid grooves, wherein the active sides of two phase coils are shifted relatively to each other being parallel to the longitudinal axis of the inductor, and phase-wise are oppositely shifted, wherein the two phase coils are situated adjacently to the third phase coil from the opposite sides thereof. The three phase coils are electrically cross-wise connected as shown on FIG. 3, wherein a first coil and a third coil are cross-wisely wound up on the core relatively to each other, and a second coil is transversely wound up on the core between the first and the third coils. The directions of running of the magnetic flux are opposite on the active sides of inductor, and coincide with the directions of movement of the rotors depicted on FIG. 3 as well.

While the fluid stream operatively revolves the turbines with the short-circuited rotors; the rotors are lead-crossing the running magnetic flux that generates active electric power in the three-phase winding. The unit thus has a minimum number of movable elements that increases its efficiency and reliability.

In an optional embodiment shown on FIG. 5A-B, the blades 1 of the above-described design can be used in conjunction with a conventional unilateral arc generator with one-directional running of the magnetic flux. The unit in this embodiment comprises one counterbalanced turbine with a plurality of blades 1 (three such blades are shown on FIG. 5A-B) substantially coupled to the rotor 3, located essentially in the middle of the turbine. The turbine can be composed of a plurality of sections (not shown), similarly to the ones illustrated on FIG. 8.

Figure 6A:
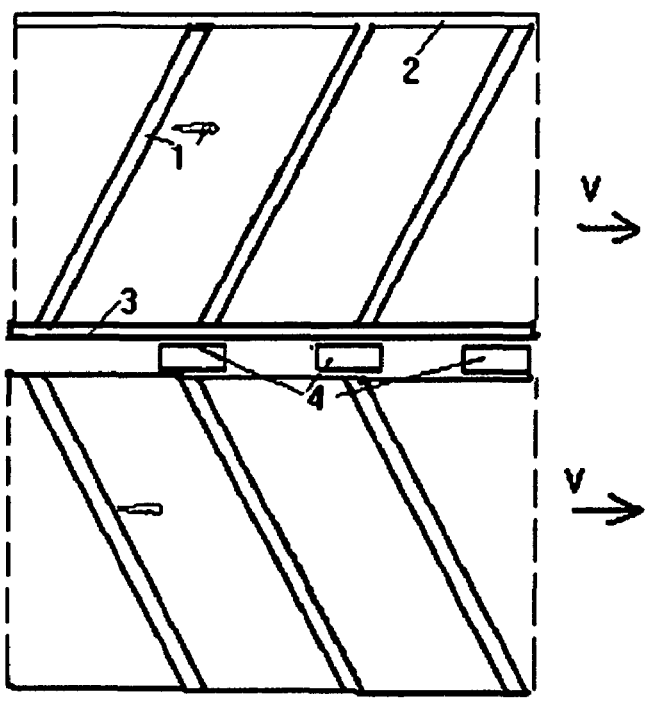
FIG. 6 is a schematic view FIG. 6A) illustrating an evolvement line of the turbine's 'V'-shaped blades of an energy conversion unit including a bilateral generator with one short-circuited rotor, and a side view (FIG. 6B) of the unit with a counterbalanced turbine, according to an embodiment of the present invention.
Figure 6B:
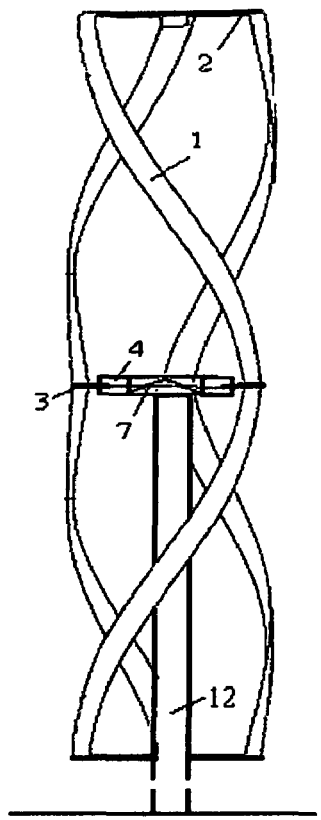
Figure 7:
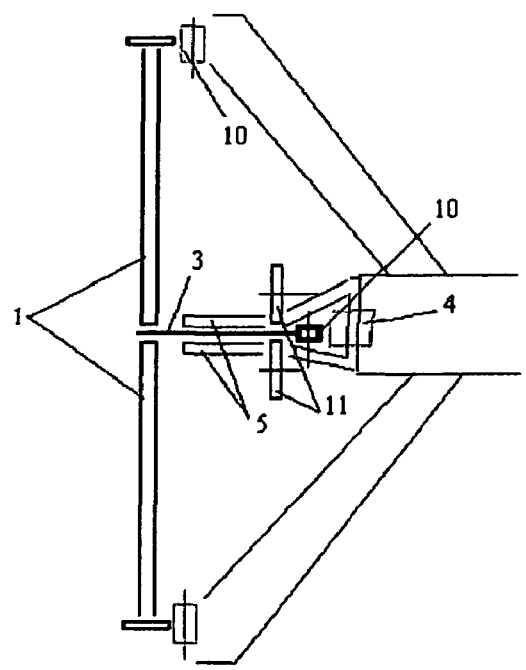
FIG. 7 is a schematic view illustrating power takeoff structure of the energy conversion unit including the bilateral electro-generator, shown on FIG. 6A-B, with one short-circuited rotor and an inductor, wherein the rotor is suspended by means of support rollers, according to an optional embodiment of the present invention.

In another optional embodiment shown on FIG. 6A-B, the blades 1 of the above-described design can be used in conjunction with a bilateral arc generator with the magnetic flux running in one direction, and having one short-circuited rotor. The unit in this embodiment comprises one counterbalanced turbine with a plurality of blades 1 (three such blades are shown on FIG. 6A-B) substantially coupled to the rotor 3, located essentially in the middle of the turbine. FIG. 7 illustrates a suspension structure for such unit that includes rollers 10, having vertical axes, and absorbing the lateral loads. Alternatively, the rollers 10 can be replaced with single bearings (not shown) mounted on the pylon 9 absorbing the radial loads from the strings 8, similarly to the structure depicted on FIG. 4. Additional sections (not shown) can be attached to the top and bottom of the turbine of this embodiment, similarly to the ones illustrated on FIG. 8.

Figure 9:
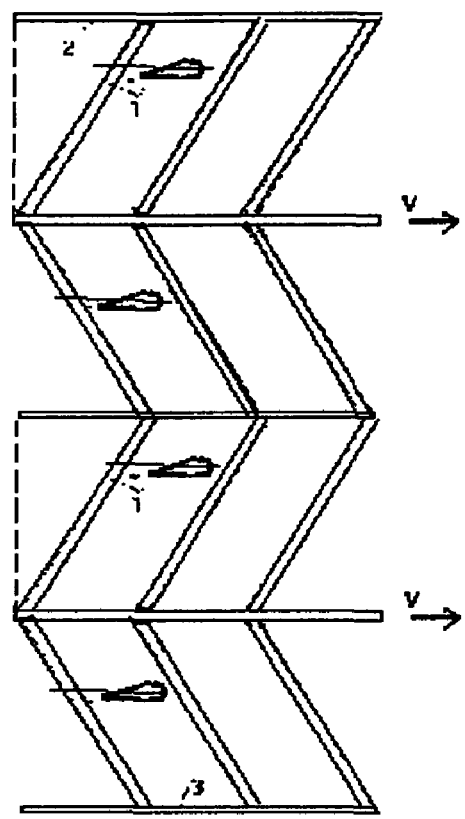
FIG. 9 is a schematic plan view illustrating the energy unit including a pair of turbines, shown on FIG. 6A-B, disposed horizontally in a river stream, angularly joined to each other, rotatable in the opposite directions, and aligned at an acute angle to the direction of the stream, according to an optional embodiment of the present invention.

In general, the aforementioned embodiments can be arranged not only in vertical structures, but also in horizontal or differently aligned structures. In an exemplary embodiment illustrated on FIG. 9, the inventive energy conversion assembly is designed for water streams with slow changing directions, for example, for river streams. The assembly comprises two energy conversion units including correspondingly a balanced turbine 15 and a balanced turbine 16 of the type shown on FIG. 6A-B, wherein the turbines are rotatable in the opposite directions, the longitudinal axes of the turbine are disposed in a substantially horizontally plane, and angularly joined to each other forming a 'V' structure, so that the longitudinal axes are normally positioned at essentially equal acute angles in relation to the direction of the stream. This unit has a self-stabilizing (or self-balancing) property: when the load applied to the first turbine even slightly increases, it starts turning in such a direction that its angle decreases that causes an increase of the angle of the second turbine that in turn causes an increase of the load applied to the second turbine, which turns the unit in the counter-direction that results in reduction of the single of the second turbine thereby returning the unit to its initial position. Such unit can be linked to an anchor (not shown), mounted to the bottom of the river, by a flexible support member (e.g. a proper cable) tied to the vertex of the 'V' structure. Therefore this embodiment cab be assembled without rigid support members described above.

I claim:

1. A unit for conversion of fluid stream energy into electric energy comprising:
at least one turbine including at least one two-tier section furnished with a plurality of longitudinally disposed aerodynamically-profiled blades directed toward each other, each said blade's axis having an evolvement line configured in a 'V'-shape and said line is bent in such a manner that forms a helix line wound upon a cylindrical surface;
and an electro-generator including at least one short-circuited rotor coupled with said blades and an inductor with a three-phase winding, said inductor is magnetically associated with said at least one rotor.

2. The unit according to claim 1, further comprising supporting means.

3. The unit according to claim 1, further comprising load absorbing means.

4. The unit according to claim 2, wherein said supporting means include rigid supporting means.

5. The unit according to claim 1, comprising:
a first turbine and a second turbine, said first and second turbines each is made of a plurality of sections joined together, the sections of the first turbine include the blades with the 'V' pointing to a first direction;
whereas the sections of the second turbine include the blades with the 'V' pointing to a second direction opposite to the first direction, and the profiles of said blades are so oriented that causing the first turbine and the second turbine to rotate in the opposite directions.

6. The unit according to claim 1, comprising:
one said turbine;
said electro-generator is performed as a unilateral arc generator with one-directional running of the magnetic flux, said electro-generator including one said short-circuited rotor; and
said one turbine is substantially coupled to said one short-circuited rotor located essentially in the middle of said one turbine.

7. The unit according to claim 1, comprising:
one said turbine;
said electro-generator is performed as a bilateral arc generator with one-directional running of the magnetic flux and including one said short-circuited rotor, and
said one turbine is substantially coupled to said one short-circuited rotor, located essentially in the middle of said one turbine.

8. The unit according to claim 7, further comprising load absorbing means.

9. The unit according to claim 1, wherein said unit comprising:
support means;
two said turbines each having at least one section furnished with said blades whose aerodynamic profiles are so oriented that cause rotation of the two turbines in the opposite directions, said turbines are supported by said support means; and
said electro-generator is performed as an arc type generator including:
two short-circuited rotors each coupled with one of said two turbines and a bilateral immovable inductor substantially supported by said support means, and including:
a magnetically conductive yoke,
a plurality of magnetically conductive teeth located at each side of said yoke, each two neighboring teeth define a groove therebetween, a plurality of stationary magnetic plates that conclude a closed-type loop of the magnetic flux crossing the yoke, the teeth, the rotors, the plates, and air gaps formed between the rotors and the respective parts of said inductor, said magnetic plates are attached to said support means via non-magnetic insertions, and a three-phase winding composed of coils comprising wires, said grooves are filled with said wires of said three-phase winding, wherein the active sides of two phase coils are shifted relatively to each, other being parallel to the longitudinal axis of said inductor, and phase-wise are oppositely shifted, wherein said two phase coils are situated adjacently to a third phase coil from the opposite sides thereof.

10. An assembly for conversion of energy of a fluid stream into electric energy comprising two units according to claim 1, wherein each said unit includes one turbine, one electro-generator performed as a bilateral arc generator with one-directional running of the magnetic flux and having one short-circuited rotor; said one turbine is substantially coupled to said one short-circuited rotor, located essentially in the middle of said one turbine;

and wherein the turbines are rotatable in the opposite directions, the longitudinal axes of said turbines are disposed in a substantially horizontally plane, and angularly joined to each other forming a 'V' structure, so that the longitudinal axes are normally positioned at essentially equal acute angles in relation to the direction of the stream.

11. The assembly according to claim 10, further comprising flexible support means.

* * * * *